(12) United States Patent
Dong et al.

(10) Patent No.: US 7,336,604 B2
(45) Date of Patent: Feb. 26, 2008

(54) NETWORK ACCESS MODULE FOR SUPPORTING A STAND ALONE MULTI-MEDIA TERMINAL ADAPTER

(75) Inventors: Runlin Dong, Fremont, CA (US); Chih-Ping Lee, Cupertino, CA (US)

(73) Assignee: Innomedia PTE, Singapore (SG)

( * ) Notice: Subject to any disclaimer, the term of this patent is extended or adjusted under 35 U.S.C. 154(b) by 1057 days.

(21) Appl. No.: 10/403,469

(22) Filed: Mar. 31, 2003

(65) Prior Publication Data
US 2004/0160963 A1    Aug. 19, 2004

Related U.S. Application Data

(63) Continuation-in-part of application No. 10/365,876, filed on Feb. 13, 2003.

(51) Int. Cl.
*H04L 12/26* (2006.01)
(52) U.S. Cl. ............... 370/230; 370/229; 370/230.1
(58) Field of Classification Search ............... 370/229, 370/230, 230.1, 232, 235, 236, 344, 347, 370/348, 349, 351, 352, 356, 357, 395.2, 370/395.21, 395.3, 395.31, 445
See application file for complete search history.

(56) References Cited

U.S. PATENT DOCUMENTS 6,236,653 B1     5/2001   Dalton et al.
6,816,500 B1 *   11/2004  Mannette et al. ........... 370/431
7,088,678 B1 *   8/2006   Freed et al. ................ 370/230

OTHER PUBLICATIONS

Society of Cable Telecommunication Engineers, A Practical Guide to Packet Cable, vol. III, Issue 12, Jul. 13, 2001.
Society of Cable Telecommunication Engineers, ANSI/SCTE 24-5, 2001.

* cited by examiner

*Primary Examiner*—Wing Chan
*Assistant Examiner*—Mark A. Mais
(74) *Attorney, Agent, or Firm*—Timothy P. O'Hagan

(57) ABSTRACT

A network access module interconnects a stand alone multi-media terminal adapter with a network controller of a frame switched network. The network access module comprises a frame switched network interface coupled to the frame switched network for communicating with the network controller. The network access module further comprises a communication link interface for communicating with the stand alone-multi media terminal adapter. A service flow module is coupled to the frame switched network interface and coupled to the communication link interface. The service flow module receives a plurality of frames of IP traffic from the multi-media terminal adapter and sorts the frames such that each frame is delivered to the frame switched network interface at a time that corresponds to a time division logical channel which corresponds to the frame. A QoS module is coupled to the service flow module and coupled to communication link interface. The QoS module generates a quality of service request for transmission to the network controller in response to receipt of a bandwidth management instruction from the multi-media terminal adapter.

20 Claims, 6 Drawing Sheets

| Message Title | Exemplary Data Fields |
|---|---|
| Dynamic Service Addition (DSA) | Service Flow Reference |
| | Requested Framing Frequency |
| | Requested Frame Size |
| | Requested Jitter |
| | Requested QoS Policy |
| | Requested Service State |
| | Discriminator Identification |
| Dynamic Service Change (DSC) | Service Flow ID |
| | Requested Framing Frequency |
| | Requested Frame Size |
| | Requested Jitter |
| | Requested QoS Policy |
| | Requested Service State |
| | Discriminator Identification |
| Dynamic Service Delete (DSD) | Service Flow ID |

Figure 4

| Message Title | Exemplary Data Fields |
|---|---|
| 122 — Dynamic Service Addition Acknowledge (DSA_ACK) | Service Flow Reference — 122a |
| | Service Flow ID — 122b |
| | Acknowledged Framing Period — 122c |
| | Acknowledged Frame Size — 122d |
| | Acknowledged Jitter — 122e |
| | Acknowledged QoS Policy — 122f |
| | Acknowledged Service State — 122g |
| | Acknowledged Discriminator ID — 122h |
| 124 — Dynamic Service Change Acknowledge (DSC_ACK) | Service Flow ID — 124a |
| | Acknowledged Framing Period — 124b |
| | Acknowledged Frame Size — 124c |
| | Acknowledged Jitter — 124d |
| | Acknowledged QoS Policy — 124e |
| | Acknowledged Service State — 124f |
| | Acknowledged Discriminator ID — 124g |
| 126 — Dynamic Service Delete Acknowledge (DSD_ACK) | Service Flow ID — 126a |

Figure 5

NETWORK ACCESS MODULE FOR SUPPORTING A STAND ALONE MULTI-MEDIA TERMINAL ADAPTER

CROSS REFERENCE TO RELATED APPLICATIONS

The present application is a continuation in part of U.S. patent application Ser. No. 10/365,876 titled Network Communication System With Stand Alone Multi-Media Terminal Adapter filed on Feb. 13, 2003 the contents of this patent application are incorporated herein.

TECHNICAL FIELD

The present invention relates to network access modules and multi-media terminal adapters for providing real time streaming media communications over a wide area packet switched network, and in particular to systems and methods for bandwidth management.

BACKGROUND OF THE INVENTION

For many years voice telephone service was implemented over a circuit switched network commonly known as the public switched telephone network (PSTN) and controlled by a local telephone service provider. In such systems, the analog electrical signals representing the conversation are transmitted between the two telephone handsets on a dedicated twisted-pair-copper-wire circuit. More specifically, each of the two endpoint telephones is coupled to a local switching station by a dedicated pair of copper wires known as a subscriber loop. The two switching stations are connected by a trunk line network comprising multiple copper wire pairs. When a telephone call is placed, the circuit is completed by dynamically coupling each subscriber loop to a dedicated pair of copper wires in the trunk line network that completes the circuit between the two local switching stations.

A key advantage of a circuit switched network is that a dedicated circuit is continually connected between the two endpoints and capable of carrying information at a fixed rate (in this case, a voice audio signal) for the entire duration of the call. A disadvantage of a circuit switched network is the size and expense of trunk lines between switching stations that must be large enough to provide a dedicated pair of copper wires for each circuit.

More recently the trunk lines between switching stations have been replaced with fiber optic cables. A computing device digitizes the analog signals of each circuit and formats the digitized data into frames such that multiple conversations can be transmitted simultaneously on the same fiber utilizing a time division protocol. At the receiving end, a computing device reforms the analog signals of each circuit for coupling to the copper wires of the subscriber loop. Fiber optic cable increases trunk line capacity between switching stations and simultaneously reduces trunk line cost.

Historically, the technology used for provision of cable television service was a separate and distinct technology from the PSTN. Cable television signals were analog signals broadcast over a multi-drop coaxial cable network. This arrangement seemed to work well, because the trunk line and subscriber loop architecture of the PSTN was conducive to end to end voice communications that required a dedicated circuit between the two endpoints while the mutli-drop architecture of the coaxial cable network was conducive to simultaneously broadcasting a television signal from a single source to multiple customers.

Advances in packet switched communication technologies, audio compression technologies, and network capacity have made it possible for telephone calls, Internet connections, and digital cable TV programming (all of which require a dedicated end-to-end communication channel) to be provided using end-to-end logical channels over a multi-drop network utilizing a packet-switched communication protocol. A Hybrid Fiber Cable (HFC) network that includes fiber optic trunk lines interconnecting digital routers which limit the multi-drop architecture to only those portions of the network that interconnect to a limited number of customers is most conducive to providing end-to-end communication channels utilizing a packet-switched communication protocol.

To enable digital telephone service over an HFC network to interoperate with a customer's traditional PSTN telephone equipment a customer gateway, at the customer's facility, performs applicable conversion to communicate over the HFC network with a "soft switch" and emulates an analog PSTN line for communication over a twisted pair copper wire network at the customer's premises. Early gateways used a committed bit rate (CBR) system wherein a dedicated time slot over the HFC network is kept open between the customer gateway and the service provider gateway and used continuously for transferring frames that, when decompressed, represent the analog subscriber loop. The time slot provides assurance of adequate bandwidth for the transmission of each frame such that it may be received on a timely basis for reproducing the analog signals at the receiving system. The time slots remain open regardless of whether a call is in progress and all call signaling and media communication are "in-band" on the subscriber loop.

More recently a digital protocol known as DOCSIS has been implemented on HFC networks as an underlying protocol that would support all of digital telephone service, digital cable television services, and Internet connection services. DOCSIS uses a dynamic quality of service model (DQOS) between a DOCSIS cable modem and a cable modem termination server (CMTS) that establishes a dedicated time slot for a telephone call only for a period of time during which the call is in progress. The advantage of the DOCSIS system over the CBR system is an overall increase in bandwidth as the system is not idle during time slots when no call is in progress.

In a DOCSIS network, a device known as an embedded multi-media terminal adapter (MTA) interfaces with the DOCSIS network and emulates a PSTN subscriber loop on the twisted pair network at the customer's premises. The embedded MTA may request a dedicated time slot from the CMTS upon initiating a telephone call, receive an assigned time slot in an acknowledgement from the CMTS, and thereafter format frames representing the telephone call to fit the period of the time slot and exchange the frames over the HFC network during the time slot. A problem with use of an embedded MTA is that it obsoletes current cable modems that do not include embedded MTA capability.

A device known as a stand alone MTA also has been contemplated. The stand alone MTA will connect to a known DOCSIS cable modem that does not include embedded MTA capability. A problem with the stand alone MTA architecture is that the MTA can not communicate directly with the cable modem—the cable modem operates only as a conduit routing frames directly between the MTA and the CMTS.

As such, reservation of a time slot by the MTA uses system known as RSVP. RSVP provides for the MTA to request a time slot from the CMTS. The CMTS verifies the authenticity of the request from the soft switch and provides the time slot information to both the cable modem and to the MTA.

A need exists for a stand alone MTA system that enables direct communication between the cable modem and the MTA and, more specifically, enables the MTA to control the dynamic quality of service function of the cable modem.

SUMMARY OF THE INVENTION

A first aspect of the present invention is to provide a network access module for interconnecting a stand alone multi-media terminal adapter with a network controller of a frame switched network. The network access module comprises a frame switched network interface coupled to the frame switched network for communicating with the network controller and a communication link interface for communicating with the stand alone-multi media terminal adapter.

A service flow module is coupled to the frame switched network interface and coupled to the communication link interface for receiving a plurality of frames of IP traffic from the multi-media terminal adapter. The service flow module sorts the frames such that each frame is delivered to the frame switched network interface for transmission to the network controller at a time that corresponds to a time division logical channel which corresponds to the frame.

A QoS module is coupled to the service flow module and coupled to communication link interface for generating a quality of service request for transmission to the network controller in response to receipt of a bandwidth management instruction from the multi-media terminal adapter.

The QoS module may further generate an instruction acknowledgment for transmission to the multi-media terminal adapter in response to receipt of a quality of service acknowledgement from the network controller.

The QoS module may comprise each of a bandwidth management instruction to quality of service request conversion table and a quality of service acknowledgment to instruction acknowledgement conversion table. The bandwidth management instruction to quality of service request conversion table is used for generating a quality of service request by looking up the quality of service request that corresponds to the bandwidth management instruction received. The quality of service acknowledgment to instruction acknowledgement conversion table is used for generating an instruction acknowledgement that corresponds to the quality of service acknowledgement received.

The bandwidth management instruction may comprise a requested framing frequency, a requested frame size, a requested jitter tolerance parameter, and a discrimination ID identifying a characteristic of each of a series of frames representing a VoIP session.

The quality of service request may comprise the requested framing frequency, the requested frame size, and the requested jitter tolerance parameter.

The quality of service acknowledgment may comprise an acknowledged framing frequency, an acknowledged framing size, an acknowledged jitter tolerance parameter, and a service flow ID assigned by the network controller.

The instruction acknowledgement may comprise the acknowledged framing frequency, the acknowledged framing size, the acknowledged jitter tolerance parameter, and the service flow ID assigned by the network controller.

The QoS module may further comprise a service flow table that associates a service flow ID of each time division logical channel to a frame period, a frame phase, and a frame size derived from at least one of the bandwidth management instruction and the quality of service acknowledgement.

The QoS module may further comprise a discrimination table that associates the service flow ID of each time division logical channel to a discrimination ID and wherein the service flow module compares a frame of IP traffic from the multi-media terminal adapter to the discrimination ID to determine the applicable time division logical channel and to deliver the frame to the frame switched network interface at the time that corresponds to the applicable time division logical channel. The discrimination ID may comprise the source address and the destination address of the frame of IP traffic.

A second aspect of the present invention is to provide a method of interfacing between a stand alone multi-media terminal adapter and a network controller of a frame switched network. The method comprises: i) establishing a communication session with the multi-media terminal adapter; ii) receiving a plurality of bandwidth management instructions from the multi-media terminal adapter; iii) generating a quality of service request to the network controller in response to each bandwidth management instruction received from the multi-media terminal adapter; iv) receiving a quality of service acknowledgement from the network controller in response to each quality of service request generated to the network controller; and v) generating an instruction acknowledgement message to the multi-media terminal adapter in response to receipt of the acknowledgement from the network controller.

The process of generating a quality of service request to the network controller in response to each bandwidth management instruction received from the multi-media terminal adapter may comprise: i) looking up a quality of service request that corresponds to the bandwidth management instruction received; ii) generating the quality of service request to the network controller; iii) determining whether a quality of service acknowledgement has been received from the network controller within a predetermined time out; and iv) generating the quality of service request to the network controller in response to termination of the time out period without receipt of an acknowledgement.

The process of generating a bandwidth management acknowledgement message to the multi-media terminal adapter in response to receipt of the acknowledgement form the network controller may comprise: i) looking up a bandwidth management response message that corresponds to the acknowledgment message received; and generating the a bandwidth management response message to the multi-media terminal adapter.

The bandwidth management instruction may be a request to reserve a time division logical channel for transmitting a series of frames representing a VoIP session. The bandwidth management instruction may include a plurality of requested time division logical channel parameters including: i) a requested framing frequency; ii) a requested frame size; iii) a requested jitter tolerance parameter; and iv) a discrimination identifier identifying a characteristic of each of the series of frames representing the VoIP session.

The quality of service request may be a request to reserve a time division logical channel for transmitting a series of frames representing a VoIP session. The quality of service request may include a plurality of requested time division logical channel parameters including: i) the requested framing frequency ii) the requested framing frequency iii) the requested frame size; and iv) the requested jitter tolerance parameter.

The quality of service acknowledgement from the network controller may include a plurality of acknowledged time division logical parameters including: i) an acknowledged framing frequency; ii) an acknowledged frame size;

iii) an acknowledged jitter tolerance parameter; and iv) a service flow ID assigned by the network controller.

The instruction acknowledgement provided to the multi-media terminal adapter may comprise a plurality of acknowledged time division logical parameters including: i) the acknowledged framing frequency; ii) the acknowledged frame size; iii) the acknowledged jitter tolerance parameter; and iv) the service flow ID assigned by the network controller.

The method may further comprise: i) receiving a plurality of frames of media data from the multi-media terminal adapter each or which associates with one of a plurality of VoIP sessions; ii) sorting each of the plurality of media frames; and iii) transmitting each of the plurality of media frames to the network controller during a time division logical channel that corresponds to the one of a plurality of VoIP sessions with which the media frame associates.

The process of establishing a communication session with the multi-media terminal adapter may comprise: i) receiving a broadcast discovery message from the multi-media terminal adapter and distinguishing the broadcast discovery message from other messages received from the multi-media terminal adapter by identifying a unique EtherType field identifying the message; ii) establishing a session ID; and iii) unicasting a discovery confirmation message to the multi-media terminal adapter utilizing the MAC access of the multi-media terminal adapter as included within the broadcast discovery message, the discovery confirmation message including the session ID.

For a better understanding of the present invention, together with other and further aspects thereof, reference is made to the following description, taken in conjunction with the accompanying drawings, and its scope will be pointed out in the appended clams.

BRIEF DESCRIPTION OF THE DRAWINGS

FIG. 4 is a table representing exemplary band with management instructions in accordance with one embodiment of the present invention;

FIG. 5 is a table representing exemplary acknowledgment messages in accordance with one embodiment of the present invention.

DETAILED DESCRIPTION OF THE EXEMPLARY EMBODIMENTS

Figure 1:
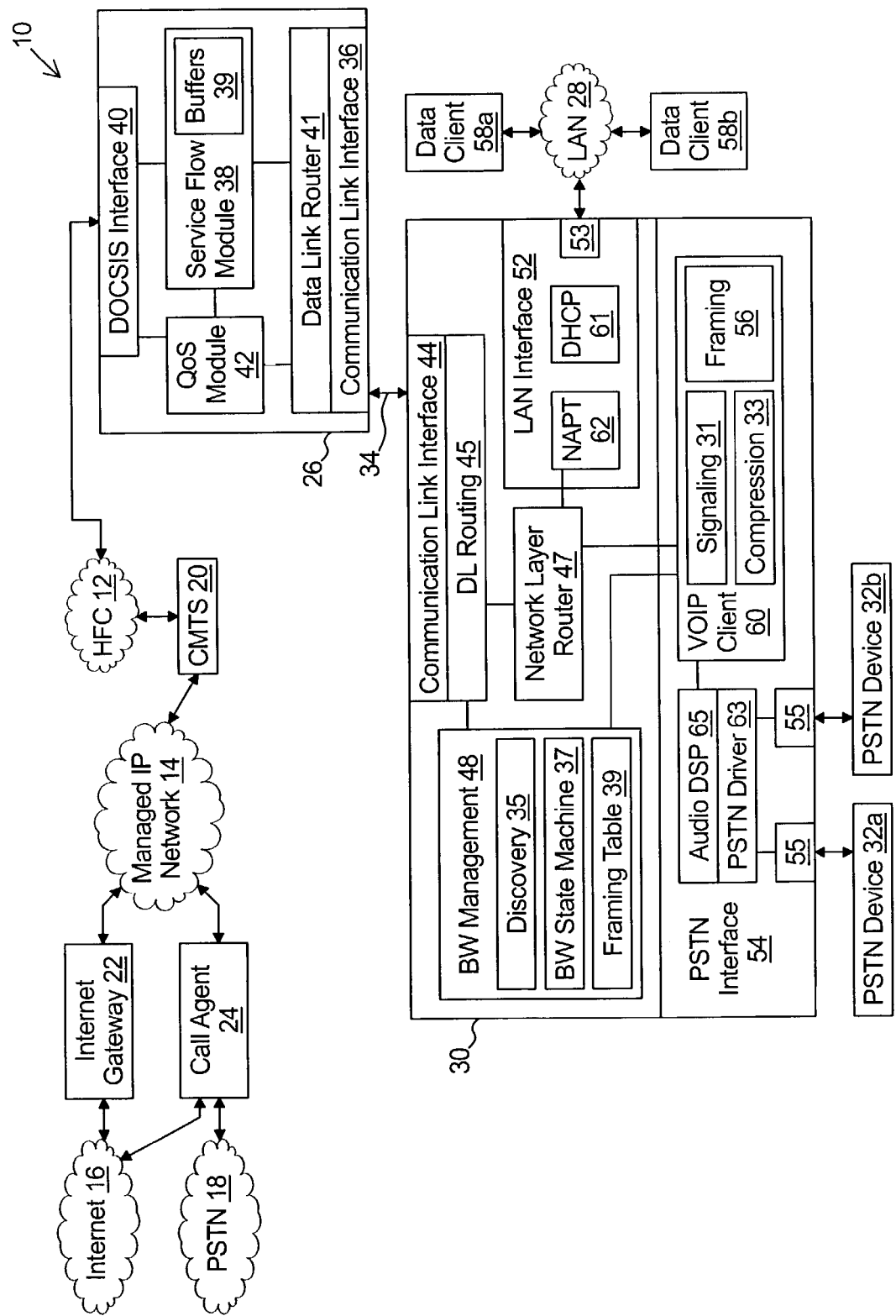
FIG. 1 is a block diagram representing a system for providing VoIP communication services over a frame switched network in accordance with one embodiment of the present invention.

The present invention will now be described in detail with reference to the drawings. In the drawings, each element with a reference number is similar to other elements with the same reference number independent of any letter designation following the reference number. In the text, a reference number with a specific letter designation following the reference number refers to the specific element with the number and letter designation and a reference number without a specific letter designation refers to all elements with the same reference number independent of any letter designation following the reference number in the drawings.

It should also be appreciated that many of the elements discussed in this specification may be implemented in a hardware circuit(s), a processor executing software code, or a combination of a hardware circuit(s) and a processor or control block of an integrated circuit executing machine readable code. As such, the term circuit, module, server, or other equivalent description of an element as used throughout this specification is intended to encompass a hardware circuit (whether discrete elements or an integrated circuit block), a processor or control block executing code, or a combination of a hardware circuit(s) and a processor and/or control block executing code.

FIG. 1 represents a system 10 for providing both voice communications and Internet data connectivity to a subscriber over a frame switched network such as a hybrid fiber/cable (HFC) network 12. The system 10 comprises a network controller such as a cable modem termination server (CMTS) 20, an Internet gateway 22, and a call agent 24 interconnected by a managed IP network 14.

The Internet gateway provides for routing IP frames between the managed IP network 14 and the Internet 16.

The call agent 24 may include known combinations of soft switch technologies, trunking gateway technologies, and signaling gateway technologies for interconnecting between PSTN call legs and VoIP call legs.

The system further includes, at each customer's premises, a network access module such as a cable modem 26 coupled to the HFC network 12 and a stand alone multi-media terminal adapter (MTA) 30 coupled to the cable modem 26 via a communication link 34. Coupled to the MTA 30 are a plurality of internet data clients 58 and a plurality of PSTN devices 32 such as PSTN telephones or fax machines.

The HFC network 12 enables the exchange of IP frames between the CMTS 20 and each cable modem 26 utilizing a protocol commonly known as DOCSIS.

Because the HFC network 12 is bandwidth limited—particularly for the transfer of IP frames from the cable modem 26 to the CMTS 20, known dynamic quality of service protocols (DOCSIS-DQoS protocols) provide capability for a cable modem 26 to make requests to the CMTS 20 for the reservation, commitment, and deletion of time division logical channels over the HFC network 12. An RTP media channel for a VoIP call leg between the MTA 30 and the call agent 24 can be transmitted over a time division logical channel to assure that each RTP frame reaches its destination within a time window in which it is useful for reconstructing an audio signal.

The present invention provides a system and method for the MTA 30 and the cable modem 26 to exchange bandwidth management instructions and acknowledgements that enable the multi-media terminal adapter 30 to control or instruct the cable modem 26 to reserve, commit and delete time division logical channels over the HFC network 12.

Cable Modem

The cable modem 26 may include a DOCSIS interface 40, a QoS module 42, a service flow module 38, a datalink layer router 41, and a communication link interface 36.

The communication link interface 36 utilizes one of a plurality of known physical layer protocols for exchanging frames with the MTA 30 over the communication link 34. Exemplary protocols include Universal Serial (USB) and Ethernet. The frames transferred between the communication link 36 and the MTA 30 may be IP traffic (e.g. IP sessions between a data client 58 and a remote Internet server or VoIP signaling or media sessions between the MTA 30 and the call agent 24) or may be bandwidth management frames (e.g general management information, bandwidth management instructions, and acknowledgements) transferred between the MTA 30 and the QoS module 42.

The datalink layer router 41 routes bandwidth management frames to the QoS module 42 and routes IP traffic to the service flow module 38 based on the EtherType field of each frame received on the communication link 34.

The DOCSIS interface 40 utilizes the known DOCSIS protocols for communicating with the CMTS 20 over the HFC network 12. The communications may include exchanging IP frames that are part of IP sessions between the MTA 30 and a remote internet server; IP frames that are part of VoIP sessions between the MTA 30 and the call agent 24, and DOCSIS-DQoS control commands between the cable modem 26 and the CMTS 20.

The service flow module 38 includes buffers 39. The service flow module receives the IP traffic sent by the MTA on the communication link 34 and receives frames representing DOCSIS_DQOS commands from the QoS application. All frames received by the service flow module 38 may be stored in buffers 39 and sorted such that each frame can be delivered to the DOCSIS interface 40 at a time applicable for transmission of the frame on the HFC network 12 within the appropriate time division logical channel. The sorting is performed with reference to a service flow table 108 for identifying the various time division logical channels that currently exist between the cable modem 26 and the CMTS 20 over the HFC network 12 and a discrimination table 106 for identifying which frames are to be transmitted within which time division logical channels and a service flow table. Both tables will be discussed in more detail herein.

The QoS module 42 operates as a slave to the MTA 30 by receiving bandwidth management instructions from the MTA 30 and making appropriate DOCSIS_DQoS request to the CMTS 20 in response to the bandwidth management instructions. Further, the QoS module 42 exchanges management information with the MTA 30 such as "heart beat" messages and responses, time of day messages, DHCP ID messages, and Syslog ID messages.

Figure 2:
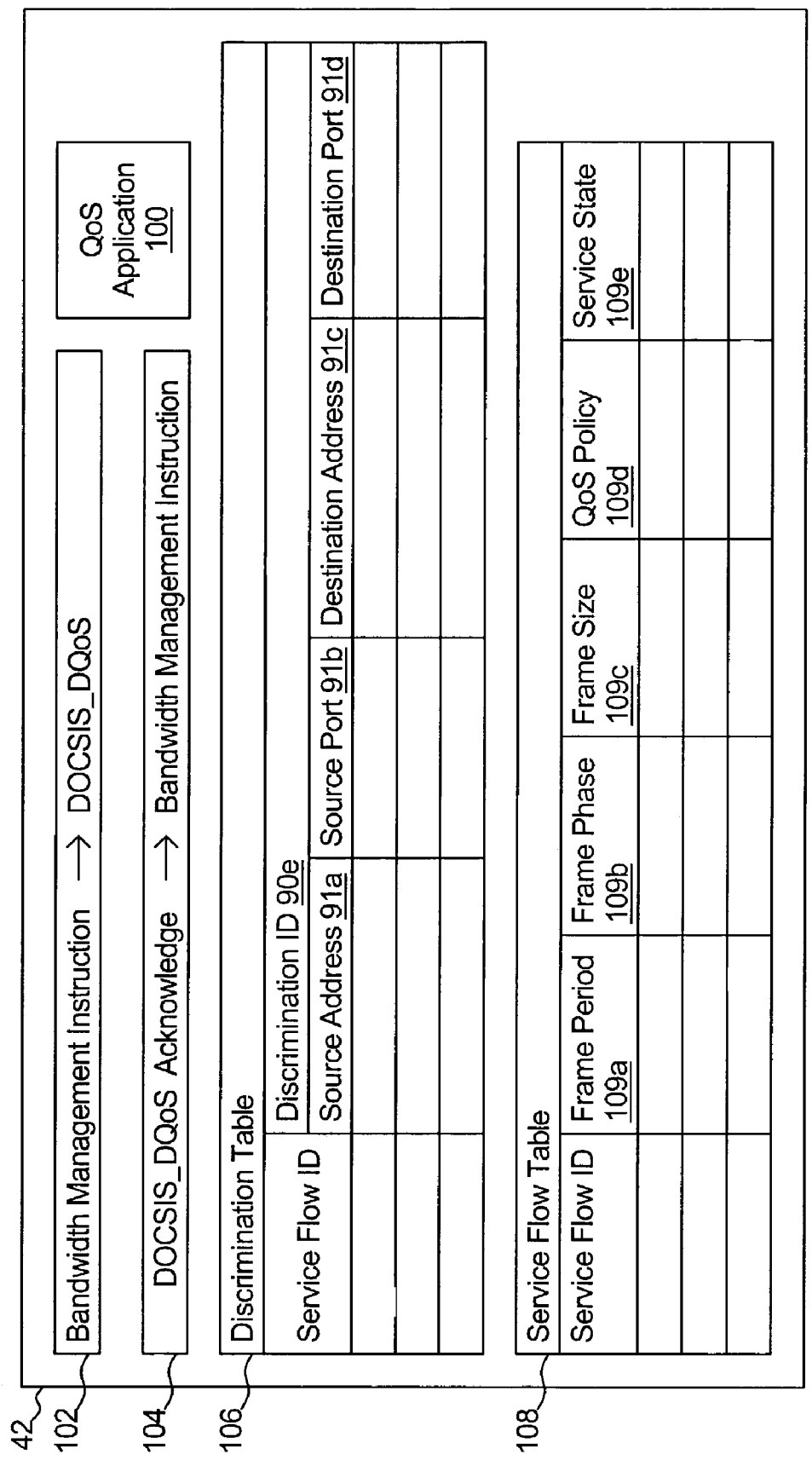
FIG. 2 is a block diagram of a dynamic quality of service module operating in an access module in accordance with one embodiment of the present invention.

Turning Briefly to FIG. 2, a block diagram of an exemplary QoS module 42 in accordance with the present invention is shown. The QoS module 42 comprises a bandwidth management instruction to DOCSIS_DQoS request conversion table 102; a DOCSIS_DQoS Acknowledge to bandwidth management acknowledge conversion table 104; the discrimination table 106, the service flow table 108, and a QoS application 100.

Figure 3:
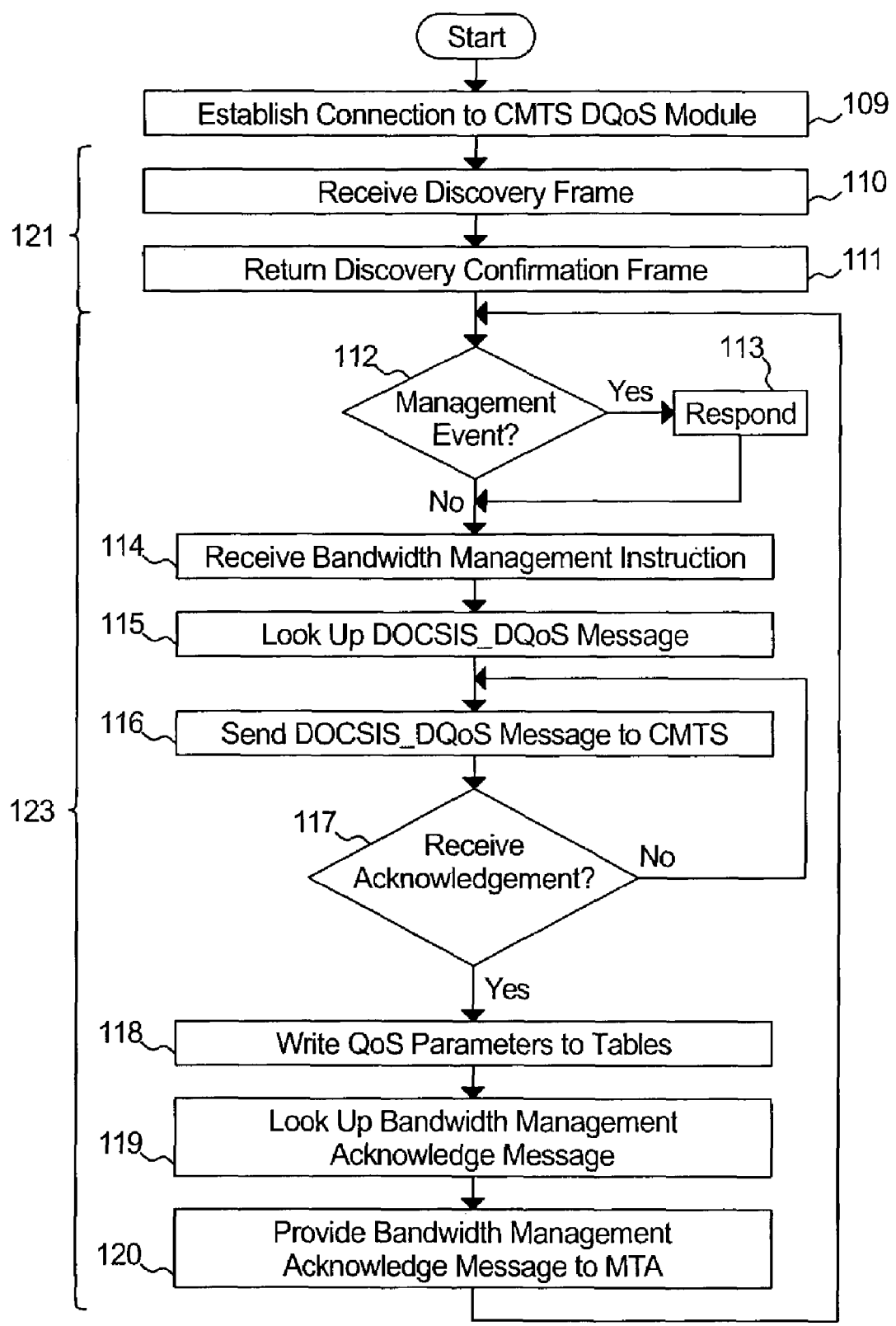
FIG. 3 is a flow chart representing exemplary operation of a dynamic quality of service application of the module of FIG. 2.

Turning briefly to the flow chart of FIG. 3 in conjunction with FIGS. 1 and 2, exemplary operation of the QoS application 100 is shown. Step 109 represents establishing a connection to the CMTS utilizing known DOCSIS DQoS commands. Step 109 will typically be performed when the cable modem 26 is first powered up and connected to the HFC network 12. Thereafter, steps 110 and 111 represent operation of the QoS application 100 in a discovery stage wherein a communication session with the MTA 30 is established. Steps 112-120 represent operation of the QoS application 100 in a session stage 123.

The communication session with the MTA 30 is established using discovery processes similar to those utilized by the point-to-point over Ethernet (PPoE) standard. More specifically, step 114 represents receiving a broadcast discovery message from the MTA 30 that is routed to the QoS module 42 by the datalink layer router 41 because it includes an EtherType that distinguishes it from frames to be routed to the service flow module 38 (e.g. EtherType field 0xAA01). The MAC address of the MTA 30 will be included within the discovery message.

Step 111 represents responding to the discovery request message with a discovery confirmation message. The discovery confirmation message will include a session ID established by the QoS application 100 and include the MAC address of the cable modem 26. The discovery confirmation message may be unicast to the MTA 30 because the MAC address of the MTA 30 was provided to the QoS module 42 in the discovery request message.

Once the session is established, at various times a management event will occur. The MTA 30 will periodically send a "heart beat" message to the cable modem 26 which enables the MTA 30 to periodically verify that the session has not been interrupted. Receipt of a "heart beat" message is a management event. Other management events include determining that a time of day message should be sent to the MTA 30, determining that a Syslog ID message should be sent to the MTA 30, and determining that a DHCP ID should be sent to the MTA 30. Step 112 represents a determination if a management event has occurred. If yes, step 113 represents responding to the MTA 30 with an appropriate management message.

Step 114 represents receiving a bandwidth management instruction from the MTA 30. The table of FIG. 4 represents exemplary bandwidth management instructions which comprise: i) Dynamic Service Addition (DSA) 90, ii) Dynamic Service Change (DSC) 92, and Dynamic Service Delete (DSD) 94.

A DSA message instructs the QoS module 42 to request reservation and/or commitment of a time division logical channel from the CMTS 20 for a new VoIP session. The DSA message 90 includes various data fields applicable to requesting a time division logical channel. The data fields comprise a service flow reference number 90a, requested frame frequency 90b, a requested frame size 90c, a requested jitter tolerance parameter 90d, a requested QoS policy 90e, a requested service state 90f (e.g. reserved or committed), and discrimination identification 90g.

The service flow reference number is identification assigned by the MTA 30 to for associating any DSA_Acknowledge message (discussed later) to the DSA message. The frame frequency 90b represents the quantity of frames that MTA 30 desires to send to the call agent 24 per period of time. The frame size 90c represents the desired size of each frame. The QoS policy 90e relates to whether the cable modem 26 is permitted to transmit other frames within the time division logical channel in the event that it is underutilized by the MTA 30. The requested jitter tolerance parameter 90d represents the permitted deviation in the time between a scheduled transmission and the actual transmission upstream on the HFC network 12. The requested service state 90f is an indicator of whether the time division logical channel should be reserved so that it is available for a pending VoIP session (but currently available for transmission of other frames) or whether it should be committed to the VoIP session wherein no other frames are transmitted therein.

The discrimination identification 90g is a representation of a characteristic of each media frame that can be utilized by the service flow module 38 to recognize IP frames for transmission on the time division logical channel. Typically the discrimination identification 90g will be at least a portion of the IP socket information that comprises one or more of a source IP address 91a, a source port number 91b, a destination IP address 91c, and a destination port number 91d.

A DSC message 92 instructs the QoS module 42 to request a modification to an existing time division logical channel from the CMTS 20. Such a request may be: i) a request to convert a reserved channel to a committed channel when the two endpoints of a VoIP session are ready to being the exchange of media data; ii) a request to convert a committed channel to a reserved channel in the event that one of the two VoIP endpoints places the other endpoint on "hold" and there is no immediate need for the exchange of media data; or iii) a request to increase the frame frequency or frame size in the event that a fax signal is detected by the MTA 30 and a fax compliant algorithm with a lower compression ratio than voice compliant algorithms must be utilized.

A DSC message 92 includes various data fields applicable to requesting a change of an existing time division logical channel. The data fields comprise a service flow ID field 92a which identifies the time division logical channel to be changed; a requested frame frequency 92b, a requested frame size 92c, a requested jitter tolerance parameter 92d, a requested QoS policy 92e, a requested service state 92f, and discrimination identification 92g.

A DSD message 94 instructs the QoS module 42 to release an existing time division logical channel—such as when a VoIP session is terminated. A DSD message 94 only requires a service flow ID 94a which identifies the time division logical channel to be released.

In response to receiving a bandwidth management instruction at step 114, the QoS application looks up the applicable DOCSIS_DQoS request(s) within the table 102 at step 115. Step 116 represents sending the DOCSIS_DQoS request(s) to the CMTS 20 over the HFC network 12.

Decision box 117 represent determining whether an acknowledgement was received from the CMTS 20 within an applicable time out period. If not, the request(s) is resent at step 116. If a response is received, the response will include confirmation of the time division logical channel parameters. At step 118, the time division logical channel parameters (and the discrimination ID) are written to the discrimination table 106 and the service flow table 108 as represented by fields 109a-109e.

Step 119 represents looking up a bandwidth management acknowledge message that corresponds to the acknowledgement(s) received from the CMTS 20 in the table 104. The table of FIG. 5, represents exemplary bandwidth management acknowledge messages. The acknowledge messages comprise: i) Dynamic Service Addition Acknowledge (DSA_ACK) 122, ii) Dynamic Service Change Acknowledge (DSC_ACK) 124, and Dynamic Service Delete Acknowledge (DSD_ACK) 126.

The DSA_ACK message 122 includes fields that confirm the time division logic channel established. The fields comprise a service flow reference number/service flow ID 122a; an acknowledged frame frequency 122b, an acknowledged frame size 122c, an acknowledged jitter tolerance 122d, an acknowledged QoS policy 122e, an acknowledged service state 122f, and an acknowledged discrimination identification 122g. The service flow ID identifies the time division logic channel and the service flow reference number is the number assigned by the MTA 30 such that the MTA 30 may associate the time division logic channel to the request.

The DSC_ACK message 124 includes fields that confirm the time division logic channel that was changed. The fields comprise the service flow ID 124a, an acknowledged frame frequency 124b, an acknowledged frame size 124c, an acknowledged jitter tolerance 124d, an acknowledged QoS policy 124e, an acknowledged service state 124f, and an acknowledged discrimination identification 124g.

The DSD_ACK message 126 acknowledges that a time division logical channel has been released. The message includes the service flow ID 126a of the released channel.

Returning to the flow chart of FIG. 3, step 120 represents sending the applicable bandwidth management acknowledge message to the MTA 30. Thereafter, the steps 112-120 are repeated.

MTA

The MTA 30 comprises a communication link interface 44, datalink router 45, a network layer router 47, a bandwidth management module 48, a LAN interface 52, and a PSTN interface 54.

The communication link interface 44 utilizes known physical layer protocols which are compliant with those utilized by the communication link 36 of the cable modem 26 such that frames may be exchanged between the MTA 30 and the cable modem 26 over the communication link 34.

The datalink layer router 45 operates to deliver bandwidth management frames received from the cable modem 26 to the bandwidth management modules 48 while routing IP traffic received from the cable modem 26 to the network layer router 47. Similar to the datalink layer router 41 of the cable modem 26, the datalink layer router 45 utilizes the EtherType field for routing.

The network layer router 47 sorts IP traffic received from the cable modem 26 to either a the LAN interface 52 or to the PSTN interface 54 based on destination port number.

The LAN interface module 52 comprises one or more network ports 53, an address server (e.g. DHCP server) 61, and a network address and port translation server 62 which in combination operate as a root node of a local IP network 28 and enables Internet connectivity to multiple data clients 58 through the port(s) 53 utilizing only a single IP address assigned to the MTA 30.

The PSTN interface module 54 comprises a plurality of PSTN ports 55, a PSTN signal driver module 63, an audio DSP 65, and a VoIP client 60.

The PSTN driver module 63 emulates a PSTN subscriber loop on each PSTN port 55 for interfacing with a traditional PSTN device 32 utilizing in-band analog or digital PSTN signaling and the audio DSP 65. The audio DSP 65 interfaces between the PSTN driver module 63 and the VoIP client 60. The Audio DSP 65: i) detects PSTN events on the PSTN port 55 such as Off Hook, On Hook, Flash Hook, DTMF tones, Fax Tones, TTD tones; and ii) generates PSTN signaling such as Ring, Dial Tone, Confirmation Tone, CAS Tone and in band caller ID. The audio DSP 65 also provides echo cancellation and conference mixing of digital audio signals.

The VoIP client 60 comprises a signaling translation module 31, a compression/decompression module 33, and a framing module 56 which, in combination, convert between: i) call signaling messages and digital audio media exchanged with the audio DSP 65 and ii) VoIP signaling and compressed audio media exchanged with the call agent 24 via the communication link 34, the HFC network 12, and the managed IP network 24.

The signaling translation module 31 converts between call signaling messages exchanged with the audio DSP 65 and the VoIP call messages exchanged with the call agent 24.

The compression/decompression module 33 operates algorithms which convert between the digital audio media exchanged with the audio DSP 65 and the compressed digital audio that may be transmitted over a VoIP call leg between the VoIP client 60 and the call agent 24. Exemplary compression/decompression algorithms utilized bye the compression/decompression module 33 include: i) algorithms that provide minimal (or no) compression (useful for fax transmission) such as algorithms commonly referred to as G.711, G.726; ii) very high compression algorithms such as algorithms commonly referred to as G.723.1 and G.729D; and iii) algorithms that provide compression and high audio quality such as algorithms commonly referred to as G.728, and G.729E.

The framing module 56 utilizes the time division logical channel parameters (as written to the framing table 39 by the bandwidth management module 48) to encapsulate compressed digital audio data into IP frames with a payload size that is most suitable to the time division logical channel over which IP frames will be transmitted on the HFC network 12. More specifically, the framing module 56 will encapsulate the compressed digital audio data into IP frames with a payload size that is less than or equal to the frame size limitation of the channel and a quantity of frames that, over a period of time, will not exceed the frame frequency limitation of the channel. Further, the discrimination ID will be included in each frame.

In the event that the quantity of compressed digital audio data generated by the compression/decompression module 33 exceeds that which can be transmitted within the time division logical channel parameters, the VoIP client 60 may either: i) provide for the framing module 56 to decimate a portion of the compressed digital audio data to assure that all encapsulated IP frames may be transmitted within the time division logical channel parameters; or ii) instruct the bandwidth management module 48 to request a modification of the time division logical channel to increase is frame frequency and/or frame period to accommodate the additional data.

The bandwidth management module 48 comprises a discovery module 35 and a bandwidth control state machine 37 which in combination establish a datalink layer connection with the QOS module 42 of the cable modem 26 and instruct QOS module 42 to reserve, commit, and release applicable time division logical channels over the hybrid fiber cable network 12.

Figure 6:
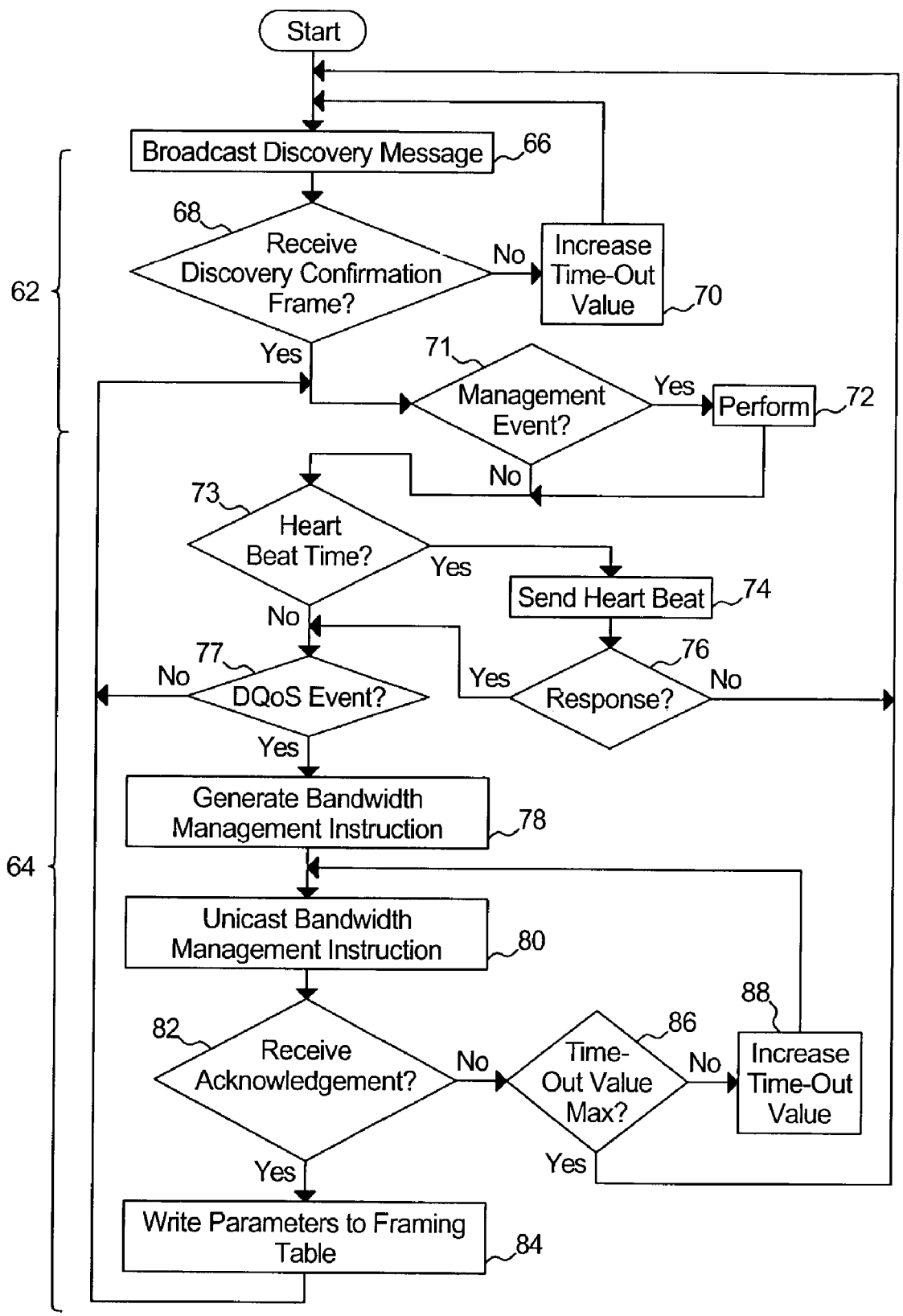
FIG. 6 is a flow chart representing exemplary operation of a bandwidth management module.

The discovery client 35 is responsible for establishing the session between the QoS application 42 and the bandwidth management module 48. Referring to the flow chart of FIG. 6 exemplary operation of the discovery client 35 is represented by the steps included within the discovery phase 62 of operation of the bandwidth management module 48.

Step 66 represents broadcasting a discovery frame on the link 34 between the MTA 30 and the cable modem 26. In the exemplary embodiment, the EtherType field of the Ethernet header of the discovery message has a value of "0xAA01" which assures that the frame will be routed to the QoS module 42 by the datalink router 41 of the cable modem 26.

It should be appreciated that because the discovery frame is a broadcast frame, there is no need for identification of the MAC address of the cable modem 26 in the discovery frame. This alleviates any requirement for inputting a MAC address of the cable modem 26 into the MTA 30 prior to initiating the discovery frame at step 66. It should also be appreciated that a MAC address of the MTA 30 will be included in the discovery frame as a source address. This enables the cable modem 26 to address a response to the MTA 30 as a unicast message.

Step 68 represents determination if a discovery session-confirmation frame has been received by the MTA 30 within time-out period. If a discovery session-confirmation frame has not been received within the time-out period, the timeout period is increased at step 70 and a new discovery message is broadcast at step 66. In the exemplary embodiment, the time-out period is doubled from an initial time out period of 200 ms each time step 68 is encountered—up until a maximum time out value of 2 seconds.

The discovery session-confirmation frame from the cable modem 26 is a frame that is unicast by the cable modem 26 to the MTA 30 using the MAC address of the cable modem 26 as a source address and includes the session ID established by the cable modem 26.

It should be appreciated that the exchange of the discovery frame and the discovery session-confirmation frame between the MTA 30 and the cable modem 26 provides for the exchange of MAC addresses and for establishing a session ID that may be used for all communications between the bandwidth management module 48 of the MTA 30 and the QoS control module 42 of the cable modem 26 over the lifetime of the connection (e.g. from initial connection or boot up until the communication link is lost due to disconnection or reset of either the MTA 30 or the cable modem 26).

After completion of the discovery stage 62, the bandwidth management module 48 enters a session stage 64. In the session stage 64, the EtherType of the header of each frame has a value of "AxAA02" and the datalink router 41 of the cable modem 26 continues to route such frames to the QoS module 42.

During the session stage 64, the bandwidth management module 48 responds to management instructions received from the cable modem 30, monitors the session with "heart beat" messages sent to the cable modem 26, and sends bandwidth management instructions to the cable modem 26.

Steps 71 and 72 represent responding to management instructions received from the cable modem 26. Decision box 71 represents determining whether a management message has been received. Upon receipt, the appropriate steps are preformed at step 72.

Steps 73-76 represents monitoring the session with "heart beat" messages. More specifically, decision box 73 represents determining whether an appropriate time has elapsed from the previous "heart beat" message to send another "heart beat" message. If yes, a "heart beat" message is sent to the cable modem at step 74. Decision box 76 represents determining whether a manage message has been received in response to the "heart beat" message. If not, the bandwidth management module 48 will re-enter the discovery state 62 at step 66.

The bandwidth management instructions that the bandwidth management module 48 may send to the QoS control module 42 of the cable modem 26 for QoS control are: i) Dynamic Service Addition (DSA), ii) Dynamic Service Change (DSC), and Dynamic Service Delete (DSD)—all as described above with respect to FIG. 4.

Decision box 77 represents determining whether a DQoS event has occurred. A DQoS event is an event that requires that a time division logical channel be established, changed, or deleted. Exemplary DQoS events comprise: an indication from the VoIP client 60 that a new channel must be reserved; an indication from the VoIP client 60 that a reserved channel must be committed; an indication from the VoIP client 60 that a reserved or committed channel must be changed to accommodate a higher or lower layer of traffic; or an indication from the VoIP client 60 that an existing channel can be released.

Following the occurrence of a DQoS event, step 78 represents generating the applicable bandwidth management instruction and step 80 represent unicasting bandwidth management instruction to the cable modem 26.

The decision box 82 represents determining whether an acknowledgement has been received from the cable modem 26 within time-out period. If an acknowledgement has not been received within the time-out period, decision box 86 represent a determination whether the time out period is at a maximum value. If not, the timeout period is increased at step 88 and a new bandwidth management instruction is unicast at step 80. If the time period is at maximum value, it can be assumed that the bandwidth management session has failed and the discovery phase 62 is repeated.

After an acknowledgement message is received at step 82, step 84 represents writing the discrimination ID (as sent by the bandwidth management module 48) and the time division logic channel parameters (as received in the acknowledgement) to the framing table 39 to be available to the VoIP client 60 for generating IP frames of an appropriate size and frequency.

It should be appreciated that the systems and methods discussed herein provide for a stand alone multi-media terminal adapter that communicates directly with a network access device and control a dynamic quality of service function of the network access device.

Although the invention has been shown and described with respect to certain preferred embodiments, it is obvious that equivalents and modifications will occur to others skilled in the art upon the reading and understanding of the specification. For example, the exemplary embodiments discussed herein operate utilizing a cable mode and an HFC network. It is readily apparent to those skilled in the art that the teachings of the present invention may also be implemented on a DSL frame switched network. The present invention includes all such equivalents and modifications, and is limited only by the scope of the following claims.

What is claimed is:

1. A cable modem for interconnecting a stand alone multi-media terminal adapter with a network controller of a frame switched network, the cable modem comprising:
   a frame switched network interface coupling the cable modem to the frame switched network for communicating with the network controller;
   a communication link interface coupling the cable modem to a communication link for communicating with the stand alone multi-media terminal adapter using physical layer communication protocols, communications with the stand alone multi-media terminal adapter comprising both band width management frames and frames of IP traffic;
   a data link router for:
      routing band width management frames between the communication link interface and a QOS module; and
      routing IP traffic between the communication link interface and a service flow module;
   the service flow module coupled to the frame switched network interface and coupled to the data link router for receiving a plurality of frames of IP traffic from the multi-media terminal adapter and for sorting the frames such that each frame is delivered to the frame switched network interface at a time that corresponds to a time division logical channel which corresponds to the frame; and
   the QoS module coupled to the service flow module and coupled to the data link router for:
      receiving a bandwidth management frame comprising a bandwidth management instruction send by the stand alone multi-media terminal adapter to the cable modem via the communication link;
      generating a quality of service request for transmission to the network controller in response to receipt of the bandwidth management instruction from the multi-media terminal adapter.

2. The cable modem of claim 1, wherein the communication link interface uses a point to point communication protocol for communication with the stand alone multi-media terminal adapter over the communication link.

3. The cable modem of claim 2, wherein the QoS module comprises a bandwidth management instruction to quality of service request conversion table for generating a quality of service request by looking up the quality of service request that corresponds to the bandwidth management instruction received.

4. The cable modem of claim 3, wherein the QoS module further generates an instruction acknowledgment for transmission to the multi-media terminal adapter in response to receipt of a quality of service acknowledgement from the network controller.

5. The cable modem of claim 4, wherein the QoS module comprises a quality of service acknowledgment to instruction acknowledgement conversion table for generating an instruction acknowledgement that corresponds to the quality of service acknowledgement received.

6. The cable modem of claim 5, wherein the bandwidth management instruction comprises a requested framing frequency, a requested frame size, a requested jitter tolerance parameter, and a discrimination ID identifying a characteristic of each of a series of frames representing a VoIP session.

7. The cable modem of claim 6, wherein the quality of service request comprises the requested framing frequency, the requested frame size, and the requested jitter tolerance parameter.

8. The cable modem of claim 7, wherein the quality of service acknowledgment comprises an acknowledged framing frequency, an acknowledged framing size, an acknowledged jitter tolerance parameter, and a service flow ID assigned by the network controller.

9. The cable modem of claim 8, wherein the instruction acknowledgement comprises the acknowledged framing frequency, the acknowledged framing size, the acknowledged jitter tolerance parameter, and the service flow ID assigned by the network controller.

10. The cable modem of claim 9, wherein the QoS module comprises a service flow table that associates a service flow ID of each time division logical channel to a frame period, a frame phase, and a frame size derived from at least one of the bandwidth management instruction and the quality of service acknowledgement.

11. The cable modem of claim 10, wherein the QoS module comprises a discrimination table that associates the service flow ID of each time division logical channel to a discrimination ID and wherein the service flow module compares a frame of IP traffic from the multi-media terminal adapter to the discrimination ID to determine the applicable time division logical channel and to deliver the frame to the frame switched network interface at the time that corresponds to the applicable time division logical channel.

12. The cable modem of claim 11, wherein the discrimination ID comprises the source address and the destination address of the frame of IP traffic.

13. A method of operating a cable modem for interfacing between a stand alone multi-media terminal adapter and a network controller of a frame switched network, the method comprising:
　establishing a communication session with the stand alone multi-media terminal adapter over a communication link coupling the cable modem to the stand alone multi-media terminal adapter;
　receiving a plurality of frames over the communication link, the frames comprising:
　　i) bandwidth management frames comprising bandwidth management instructions from the stand alone multi-media terminal adapter; and
　　ii) frames of IP traffic from the stand alone multi-media terminal adapter;
　routing the bandwidth management frame to a QoS module for generating a quality of service request to the network controller in response to each bandwidth management instruction received from the multi-media terminal adapter;
　routing the frames of IP traffic a service flow module for sorting of such frames such that each such frame is delivered to the frame switched network interface at a time that corresponds to a time division logical channel which corresponds to the frame;
　receiving a quality of service acknowledgement from the network controller in response to each quality of service request generated to the network controller; and
　generating an instruction acknowledgement message to the multi-media terminal adapter over the communication link in response to receipt of the acknowledgement from the network controller.

14. The method of claim 13, wherein establishing a communication session with the stand alone multi-media terminal adapter comprises establishing a point to point communication session with the stand alone multi-media terminal adapter.

15. The method of claim 14, wherein the process of generating a quality of service request to the network controller in response to each bandwidth management instruction received from the multi-media terminal adapter comprises:
　looking up a quality of service request that corresponds to the bandwidth management instruction received;
　generating the quality of service request to the network controller;
　determining whether a quality of service acknowledgement has been received from the network controller within a predetermined time out; and
　generating the quality of service request to the network controller in response to termination of the time out period without receipt of an acknowledgement.

16. The method of claim 15, wherein the process of generating a bandwidth management acknowledgement message to the multi-media terminal adapter in response to receipt of the acknowledgement form the network controller comprises:
　looking up a bandwidth management response message that corresponds to the acknowledgment message received; and
　generating the a bandwidth management response message to the multi-media terminal adapter.

17. The method of claim 16, wherein:
　the bandwidth management instruction is a request to reserve a time division logical channel for transmitting a series of frames representing a VoIP session, the bandwidth management instruction includes a plurality of requested time division logical channel parameters including:
　　a requested framing frequency
　　a requested frame size;
　　a requested jitter tolerance parameter; and
　　a discrimination identifier identifying a characteristic of each of the series of frames representing the VoIP session; and
　the quality of service request is a request to reserve a time division logical channel for transmitting a series of frames representing a VoIP session, the quality of service request includes a plurality of requested time division logical channel parameters including:
　　the requested framing frequency
　　the requested framing frequency
　　the requested frame size; and
　　the requested jitter tolerance parameter.

18. The method of claim 17, wherein:
　the quality of service acknowledgement from the network controller includes a plurality of acknowledged time division logical parameters including:
　　an acknowledged framing frequency
　　an acknowledged frame size;
　　an acknowledged jitter tolerance parameter; and
　　a service flow ID assigned by the network controller; and
　the instruction acknowledgement provided to the multi-media terminal adapter comprises a plurality of acknowledged time division logical parameters including:
　　the acknowledged framing frequency
　　the acknowledged frame size;
　　the acknowledged jitter tolerance parameter; and
　　the service flow ID assigned by the network controller.

19. The method of claim 18, further comprising:
　receiving a plurality of frames of media data from the multi-media terminal adapter each or which associates with one of a plurality of VoIP sessions;
　sorting each of the plurality of media frames; and
　transmitting each of the plurality of media frames to the network controller during a time division logical channel that corresponds to the one of a plurality of VoIP sessions with which the media frame associates.

20. The method of claim 19, wherein the process of establishing a communication session with the multi-media terminal adapter comprises:
　receiving a broadcast discovery message from the multi-media terminal adapter and distinguishing the broadcast discovery message from other messages received from the multi-media terminal adapter by identifying a unique EtherType field identifying the message;
　establishing a session ID; and
　unicasting a discovery confirmation message to the multi-media terminal adapter utilizing the MAC access of the multi-media terminal adapter as included within the broadcast discovery message, the discovery confirmation message including the session ID.

* * * * *